July 30, 1929.  B. WILSON  1,722,875

PULLEY

Filed March 24, 1928

Broadus Wilson
Inventor

Patented July 30, 1929.

1,722,875

UNITED STATES PATENT OFFICE.

BROADUS WILSON, OF RALEIGH, NORTH CAROLINA.

PULLEY.

Application filed March 24, 1928. Serial No. 264,481.

My invention relates to improvements in pulleys particularly the kind used for adjusting window shades, light awnings, and curtains; and the objects of my improvements are to provide pulleys which will be easier to install and which will be smaller and more compact than those on the market at present.

Figure 1:
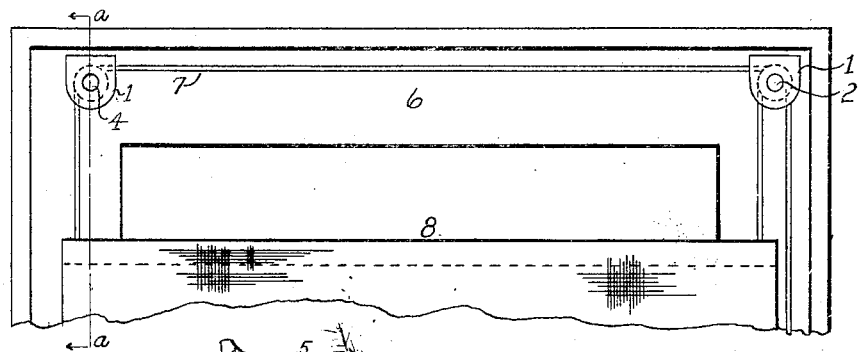
Figure 2:
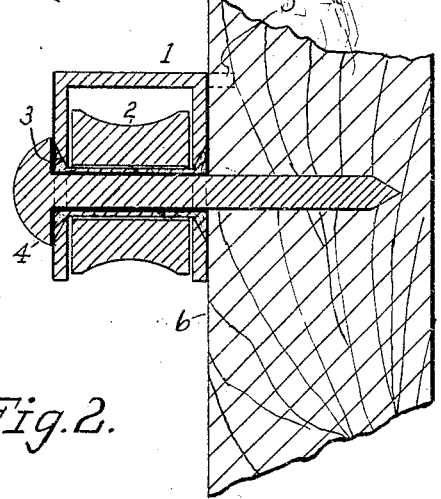
Figure 3:
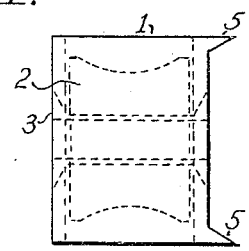
Figure 5:
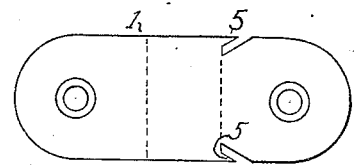
Figure 4:
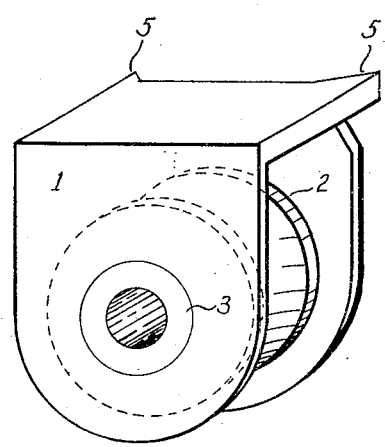

I attain these objects by the device shown in the accompanying drawing in which like numbers refer to the same parts throughout the several views. Figure 1 shows two of the pulleys in position on a window, showing relation to window and shade. Figure 2 is a cross section of the pulley taken on the line A—A Figure 1. Figure 3 is a plan view of the pulley taken from the top. Figure 4 is a perspective view of the pulley. Figure 5 shows the blank for forming housing 1 before bending, showing how prongs 5 are formed.

In the figures, 1 is the housing or frame, the roller 2 over which the cord 7 is passed is mounted in the housing 1 by means of a hollow rivet 3, which is set flush with the outside of the housing 1. The supporting or fastening nail 4 is put through this rivet and driven into the window casing 6 or other object to which it is desired to attach pulley. Obviously a screw or bolt could be used instead of the nail. In the preferred form of my invention the prongs 5 are provided at the top of the back of the pulley which may be pushed into the casing 6 before fastening with nail 4. These points are preferably punched and formed integral with the body of the housing 1.

It will be readily appreciated that to install this type of pulley the workman has only to press the pulley against the window casing 6 in its proper position to cause the prongs 5 to stick in the casing 6, holding the pulley in position until nail can be inserted in the hollow rivet-spindle 3, which will also act as a guide and support for the nail 4 while it is being driven into the casing 6. This is a very great convenience in installing shades such as shown in Figure 1 as it is often very difficult to hold the shade 8, cords 7, pulleys and brackets and at the same time locate and fasten the pulleys in their proper position. In this device the prongs 5 are sharp and readily hold the weight of the cord 7 while the nail 4 is being inserted and driven. The prongs 5 also keep the housing from turning on the nail 4. One prong or more than two prongs could be used and these might be located in a position other than the top of the housing 1 without altering the spirit and scope of my invention. I am aware that pulleys have been made with hollow spindles and do not wish to claim such a combination broadly, but

I claim:

1. A blank for a pulley yoke consisting of an elongated strip having holes for the reception of pulley-supporting means adjacent respective ends, there being cuts in opposite side edges of said strip adjacent one hole extending in the general direction of the other hole whereby, when the strip is bent on a transverse line through said cuts, projecting edge portions of the strip will remain for forming projecting prongs.

2. A U-shaped yoke for a pulley support, means carried by the legs of the U for supporting a pulley, a pulley rotatable on said means, the base of the U having prongs formed in its side edges and projecting in its plane, beyond the plane of the adjacent leg.

3. A blank for a pulley yoke consisting of an elongated strip having means for the reception of a pulley adjacent respective ends, there being an opening in the strip adjacent one means defining a prong pointing in the general direction of said means.

4. A blank for a pulley yoke consisting of an elongated strip having holes for the reception of a pulley supporting means adjacent respective ends, there being a cut in at least one side edge of said strip adjacent one hole and extending in the general direction of the other hole.

5. A pulley supporting device comprising a U-shaped yoke having a substantially flat base and having integral prongs on said base projecting beyond the plane thereof, a spindle having an opening extending longitudinally throughout its length secured to and connecting the legs of the yoke and adapted to receive a securing device through said opening and a pulley rotatably mounted on said spindle between the legs of the yoke.

In testimony whereof I have affixed my signature.

BROADUS WILSON.